Jan. 6, 1925.

O. L. SMITH 1,522,461

BRAKE BAND LINING DRILLING MACHINE

Filed April 19, 1923

INVENTOR.
Oscar L. Smith
BY
ATTORNEY

Patented Jan. 6, 1925.

1,522,461

UNITED STATES PATENT OFFICE.

OSCAR L. SMITH, OF RYDAL, PENNSYLVANIA, ASSIGNOR TO PENN RIVET CORPORATION, OF PHILADELPHIA, PENNSYLVANIA, A CORPORATION OF VIRGINIA.

BRAKE-BAND-LINING-DRILLING MACHINE.

Application filed April 19, 1923. Serial No. 633,294.

*To all whom it may concern:*

Be it known that I, OSCAR L. SMITH, a citizen of the United States, residing at Rydal, in the county of Montgomery and State of Pennsylvania, have invented an Improvement in Brake-Band-Lining-Drilling Machines, of which the following description, in connection with the accompanying drawings, is a specification, like characters on the drawings representing like parts.

This invention relates to drilling machines for drilling holes in work and more particularly to drilling machines for drilling holes in brake band linings registering with holes previously formed in the brake band itself.

In the practical use of brake bands for vehicles such as automobiles and the like, it is now the common practice to line the brake band with some material to frictionally grip the brake element with which it cooperates. In order that the brake band lining may be effectively secured to the brake band, it is now the common practice to secure the brake band lining to the brake band by rivets or bolts, and during the manufacture of the brake band to provide a series of holes for this purpose.

The brake band lining, however, is now usually furnished in long strips and unprovided with holes for the bolts or rivets which are to connect the lining with the brake band.

One of the objects of the present invention, therefore, is to provide a machine which shall effectively and accurately form holes in the brake band lining registering with the previously formed holes in the brake band itself.

Since the brake band has been previously provided with holes for the rivets or bolts, it is important that the holes which are formed in the brake band lining shall be in register with the previously formed holes in the brake band. Therefore an important feature of the present invention consists in a finder or pilot which shall engage one of the holes in the brake band and accurately position it for the operation of the drill, and during the advancing movement of the drill that the finder or pilot shall be automatically removed from its engagement with the hole in the brake band.

The various features of the invention and the novel combination of parts will best be made clear from the following description and the accompanying drawings of one good form thereof.

Figure 1:
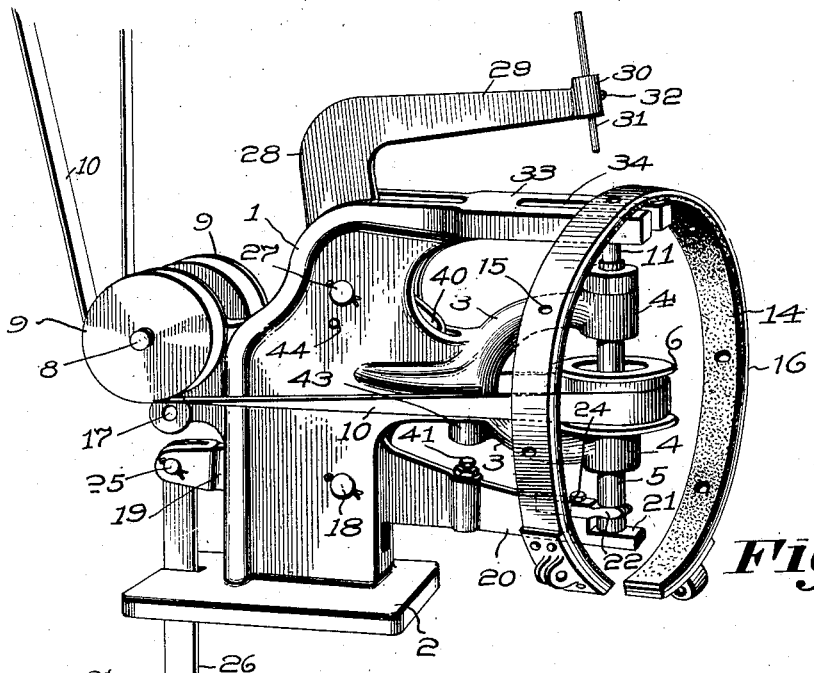
Fig. 1 is a perspective view of a drilling machine containing the present invention.

While the primary purpose of the present invention is best made manifest in connection with the drilling of holes in a brake band lining registering with holes previously formed in the brake band itself, it is to be understood that the machine of the present invention may be advantageously employed in connection with other work.

The machine frame 1 may be of a construction to properly support the operating mechanism, and in the present instance is shown as a casting rising from a base 2 which may be secured to a bench or other supporting element. The machine frame 1 may be conveniently formed of a casting or castings between the sides of which some of the operating parts may be enclosed.

Extending from the machine frame 1 are the arms 3 having bearings 4 for the drill shaft 5 which may be longitudinally movable in the bearings 4. Between the bearings 4 the drill shaft 5 is provided with a pulley 6 secured thereto by a set screw or like means 7.

Mounted upon the machine frame 1 is a stud or dead shaft 8 carrying the two rotating guides 9 about which pass a belt 10 which may be driven from a suitable source of power. The location of the shaft 8 is such that the belt 10 after passing about the guide pulleys 9 may extend in substantially horizontal direction about the pulley 6, the construction being such that the drill shaft 5 will be given continuous rotary movement.

Secured to the drill shaft 5 is the brake band lining drill 11, the operating end portion 12 of which may be provided with suitable cutting portions shaped to provide the desired form of hole or opening in the brake band lining.

Figure 3:
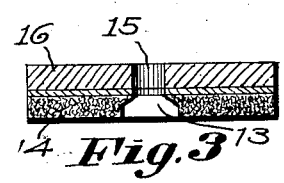
Fig. 3 is an enlarged cross-sectional view of the brake band and brake band lining with the hole in the brake band lining registering with the hole in the brake band.

In the present instance the drill 11 is formed to provide an opening 13 in the brake band lining 14, having a widened face portion as indicated in Fig. 3, and a narrowing portion merging into the previously formed opening or hole 15 in the brake band 16.

Where the source of power for driving the belt 10 is below the main frame of the machine, the guide pulleys 9—9 may be transferred to and supported upon a cross or dead shaft 17, so that the periphery of the guide pulleys 9 whether supported on the shaft 8 or the shaft 17 will direct the driving belt 10 in a substantially horizontal direction about the pulley 6.

Pivotally supported at 18 on the machine frame is the drill advancing lever 19, having the frontwardly extending arm 20, formed with a rest or stop 21 for the lower end of the drill shaft 5, and to insure that the drill shaft 5 shall be moved longitudinally in either direction positively, the lever 19 is provided with the projecting bifurcated arms 22 which engage a suitable recess 23 in the lower end portion of the drill shaft 5. The arm 22 may be secured to the lever in any suitable manner, as by the screw 24, the construction being such that upon rocking movement of the lever 19 upon its pivotal support 18 the drill shaft 5 will be positively moved longitudinally.

Connected to the drill lever 19 at 25 is a downwardly extending rod 26 which may be appropriately connected to a treadle for manually rocking the drill lever 19 on its pivotal mounting.

Above the lever 19 and pivotally connected to the main frame of the machine at 27 is the finder arm 28 which extends upwardly and is turned laterally at 29 to provide at 30 a holder for the finder or pilot 31 which may be secured in place by a set screw 32 which permits adjustment of the finder 31 longitudinally.

Between the drill and finder, the present invention provides a fixed support 33 for the work. In the present instance the support 33 is formed as an arm extending from the machine frame and has a slot 34 through which the drill 11 may extend as the drill is advanced to perform its operating functions.

In case the brake band lining 14 is of the internal type, as indicated in Fig. 1, the brake band and lining are sustained upon the supporting arm 33 with the opening of the brake band extending downwardly, as indicated in Fig. 1, with the brake band lining facing the drill. If, however, the brake band lining is of the external type, the brake band and lining will be supported on the arm 33 with the opening of the brake band extending upwardly about the finder.

In accordance with the present invention, the brake band is supported in fixed position to form the hole or opening in the brake band lining, so that it will register with the previously formed opening or hole in the brake band, and to this end the present invention provides a finder or pilot which is caused to automatically engage a hole or opening in the brake band in line with the drill, and as the drill advances in a direction towards the work to form the hole or opening in the brake band lining, the finder is also automatically removed from its engagement with the hole in the brake band, so that during the formation of the hole in the lining by the drill, the finder will not be injured by engagement with the drill.

Figure 2:
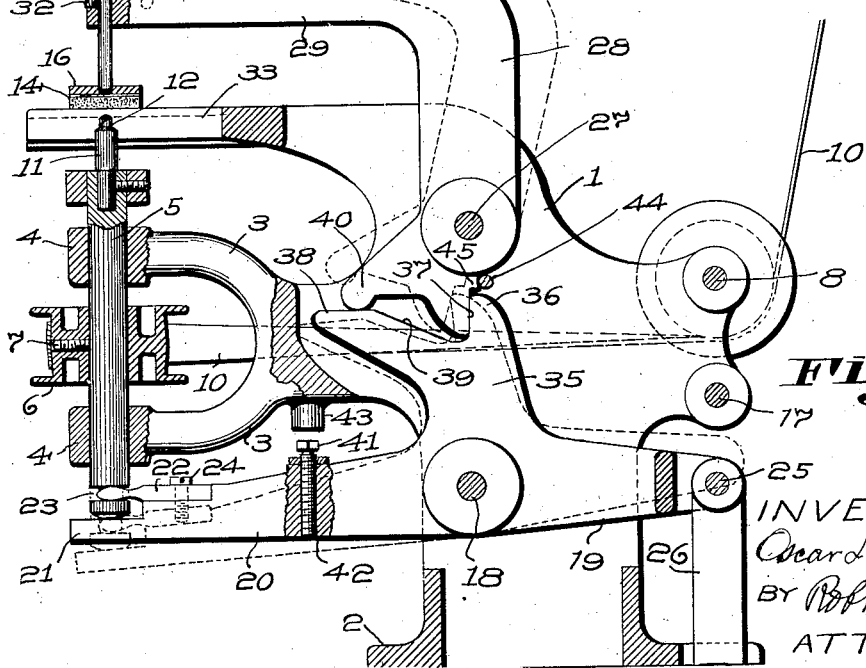
Fig. 2 is an enlarged sectional view longitudinally through the machine.

The drill lever 19 is provided with an upward extension 35 having a toe portion 36 which, when the machine is at rest and the finder arm is in its raised or dotted line position, Fig. 2, bears against a shoulder portion 37 extending downward from the pivotal support 27 of the finder arm. The engagement of the toe portion 36 with the shoulder portion 37 holds the finder 31 in the elevated position as long as the drill shaft 5 is depressed, so that the brake band may be readily placed upon the supporting arm 33, and as the drill shaft is moved toward the brake band by the lever 19 the toe portion 36 moves in a clockwise direction and permits the finder arm to rock downwardly under its own weight to bring the finder 31 into a hole 15 of the brake band. This serves automatically to position the brake band so that the drill 12 will form a hole in the brake band lining that will register with the hole 15.

It is important that the drill 12 be prevented from contacting with the finder 31, and the present invention therefore contemplates means for automatically withdrawing the finder 31 from the brake bands as the drill 12 performs its cutting operations. To this end the drill lever 19 is provided with a lifter 38, extending, in the present instance, towards the front of the machine, and between the lifter 38 and the toe 36 the upward extension 35 is recessed at 39 to permit the necessary movement of the shoulder 37 of the finder arm. Extending downwardly from the finder arm 28 is a lug or projection 40, which upon depression of the treadle to advance the drill into engagement with the work is engaged by the lifter 38 thereby positively and automatically moving the finder from its full to its dotted line position, Fig. 2, as the drill advances.

In the present instance of the invention the projections 37 and 40 extending from the finder arm 28 are formed integrally with the lifter arm, but this integral formation, of course, is not essential, the requirements being that when the brake band and lining are placed upon the supporting arm 33, and the foot treadle is depressed to advance the drill that the finder will first move into engagement with the previously formed hole in the brake band, and in the present instance of the invention this is effected by the weight of the overhanging portion 29 of the finder arm. When the finder 31 has properly located the work so that the hole or opening in the brake band lining will be formed by the drill in registration with the previously formed opening 15 in the brake band, the present invention contemplates that the finder will be automatically removed from its engagement with the hole in the brake band, and in the present instance this is effected by engagement of the lifter 38 on the drill lever 19 with the projection 40 on the finder arm.

The sequence of operations may be briefly stated as follows: The machine attendant places the brake band and brake band lining on the supporting arm 33 with the lining facing the drill. He then depresses the foot treadle to advance the drill, the initial effect of which is to permit the finder to engage a hole previously formed in the brake band and aline said hole with the advancing drill. On further depression of the treadle, however, the interengaging portions 38 and 40 on the drill lever and finder arm cause the latter to be positively and automatically removed to withdraw the finder 31 from engagement with the hole in the brake band as the drill continues its further advance, so that when the drill is passing through the work or lining of the brake band, the finder will be removed from contact with the drill and yet the work will have been accurately positioned for the formation of the opening or hole in the lining registering with the corresponding opening or previously formed hole in the brake band.

To avoid any action of the drill on the previously formed opening 15 in the brake band, after the drill has formed the registering opening in the brake band lining, the present invention provides a stop 41 which may be formed as the head of an adjusting screw 42 to contact with the abutment 43 on the machine frame when the drill lever has advanced the drill its full operating stroke. The adjustable stop 41 adapts the machine for operation upon brake linings of different thicknesses.

In some cases it may be desirable to provide the stop 44 for limiting the positioning movement of the finder 31 and in the present instance the stop 44 is formed as a pin secured transversely of the path of movement of the shoulder 45 extending downwardly from the pivotal support 27 of the finder arm.

What is claimed is:

1. In a machine for drilling brake band linings, the combination of a support for the brake band, a drill disposed at one side of said support for drilling holes in the brake band lining in register with holes previously formed in the brake band, a finder located at the opposite side of the support, a rocking lever for moving the drill toward and from the brake band lining, and means operable by the rocking movement of the lever in the drill advancing direction to move the finder into position to locate the work for the drill and thereafter upon a continued moving of the lever in the same direction to withdraw the finder from the work.

2. In a machine for drilling brake band linings, the combination of a support for the brake band, a drill disposed at one side of said support for drilling holes in the brake band lining in register with holes previously formed in the brake band, a finder located at the opposite side of the support, means for moving the drill into cutting engagement with the brake band lining, and a finder supporting arm operable by said means to move the finder into position to locate the work as the drill approaches the work and operable to withdraw the finder from the work before the drill completes its advancing movement.

3. In a machine for drilling brake band linings, the combination of a support for the brake band, a drill disposed below the support for drilling holes in the brake band lining in register with holes previously formed in the brake band, a finder located above the support, means for moving the drill into cutting engagement with the brake band lining, and means actuated by the drill moving means for moving the finder into position to locate the work as the drill approaches the work and operable to withdraw the finder from the work before the drill completes its advancing movement.

4. In a machine for drilling brake band linings, the combination of a support for the brake band, a drill disposed at one side of said support for drilling holes in the brake band lining in register with holes previously formed in the brake band, a finder located at the opposite side of the support, a lever for moving the drill into cutting engagement with the brake band and for imparting its movement to the finder to move the latter into position to locate the work as the drill approaches the work and to withdraw the finder from the work before the drill completes its advancing movement.

5. In a machine for drilling brake band linings, the combination of a drill for drilling holes in the brake band lining in register with holes previously formed in the brake band, a finder for engaging the holes in the brake band, a support for the brake band and lining between the finder and drill, a lever for advancing the drill toward the work, a pivoted arm upon which the finder is mounted, cooperating projections upon the lever and arm for effecting movement of the finder into position to locate the work as the drill approaches the work, and other cooperating projections upon the lever and arm for moving the finder away from the work as the drill completes its advancing movement.

6. In a machine of the class described, the combination of a drill for drilling holes in the work in register with other holes previously formed in another part of the work, means for advancing the drill to the work, a finder arm pivotally mounted and having a finder which automatically engages one of the previously formed holes in the work as the drill is advanced towards the work, and means operated by the drill advancing means for automatically swinging the finder arm in a direction to withdraw the finder from engagement with the previously formed hole in the work as the drill continues its further advance.

7. In a machine of the class described, the combination of a drill for drilling holes in a brake band lining in register with holes previously formed in the brake band, a drill lever for advancing the drill, a finder arm having a finder which automatically engages a hole in the brake band as the drill is advanced, and means between the drill lever and the finder arm and operable by the former for automatically moving the finder into position to locate the work as the drill approaches the work and for withdrawing the finder from the hole in the brake band as the drill continues its advancing movement.

8. In a machine of the class described, the combination of a drill for drilling holes in the work in register with other holes previously formed in another part of the work, a rocking lever for advancing the drill to the work, a finder arm pivotally mounted and having a finder which automatically engages one of the previously formed holes in the work to position the work as the drill is advanced towards the work, cooperating elements upon the lever and finder arm for effecting movement of the finder to the work engaging position as the lever advances the drill towards its work, and other cooperating elements upon the lever and finder arm for moving the latter away from the work as the lever approaches the completion of its drill feeding movement.

9. In a machine for drilling holes in a brake band lining, the combination of a drill for drilling holes in the brake band lining registering with holes previously formed in the brake band, means for rotating the drill, means for advancing the drill during its rotation, a finder arm having a finder for automatically engaging a hole previously formed in the brake band to position the work as the drill is advanced towards the brake band lining, a support between the drill and finder for supporting the brake band with the lining towards the drill, and means under the control of the drill advancing means for moving the finder into engagement with the work and for automatically removing the finder from engagement with the hole in the brake band during the continued advance of the drill.

10. In a drilling machine of the class described, the combination of a drill for drilling holes in a brake band lining registering with holes previously formed in the brake band, a lever having an arm for advancing the drill, means for continuously rotating the drill, a finder arm having a finder which automatically engages a hole in the brake band in line with the drill as the drill is advanced, a support for the brake band between the drill and finder for supporting a brake band with the lining next to the drill, and interengaging connections between the drill advancing lever and the finder arm for controlling the movement of the finder toward the work and for automatically withdrawing the finder from its engagement with the hole in the brake band as the drill is further advanced.

11. In a machine for drilling holes in the linings of brake bands, the combination of a stationary support for the brake band, a drill movable in a rectilinear path towards and into the brake band lining, means for advancing the drill, a finder pivoted upon the machine frame and automatically movable by the drill advancing means to engage a hole in the brake band as the drill is advanced towards the work, and means automatically actuated by the drill advancing means for removing the finder from engagement with the hole in the brake band before the drill completes its advancing movement.

12. In a machine for drilling brake band linings, the combination of a support for the brake band, a drill located at one side of the support for drilling holes in the brake band lining in register with holes previously formed in the brake band, a finder located at the opposite side of said support, means for advancing the drill to act upon the brake band lining, and means operable by the drill advancing means to actuate the finder in locating the work for the action of the drill.

13. In a machine for drilling brake band linings, the combination of a support for the brake band, a drill located at one side of the support for drilling holes in the brake band lining in register with holes previously formed in the brake band, a finder located at the opposite side of said support, means for advancing the drill to act upon the brake band lining, and means operated by the drill advancing means to move the finder to locate the work and then remove the finder from the work after the latter has been located.

14. In a machine for drilling brake band linings, the combination of a stationary support for the brake band, a drill located at one side of the stationary support for drilling holes in the brake band lining in register with holes previously formed in the brake band, means for advancing the drill to act upon the brake band lining, a finder, and connections between the finder and drill advancing means for effecting movement of the finder into engagement with the work on the stationary support as the drill is advanced.

In testimony whereof, I have signed my name to this specification.

OSCAR L. SMITH.